United States Patent
Shinoda et al.

(10) Patent No.: US 11,566,671 B2
(45) Date of Patent: Jan. 31, 2023

(54) CONSTANT-VELOCITY UNIVERSAL JOINT

(71) Applicants: TOYOTA JIDOSHA KABUSHIKI KAISHA, Toyota (JP); JTEKT CORPORATION, Osaka (JP)

(72) Inventors: Yoshitaka Shinoda, Nagakute (JP); Masahito Ikeo, Kariya (JP); Yoshinari Sakai, Takahama (JP)

(73) Assignees: TOYOTA JIDOSHA KABUSHIKI KAISHA, Toyota (JP); JTEKT CORPORATION, Osaka (JP)

( * ) Notice: Subject to any disclaimer, the term of this patent is extended or adjusted under 35 U.S.C. 154(b) by 357 days.

(21) Appl. No.: 16/733,450

(22) Filed: Jan. 3, 2020

(65) Prior Publication Data

US 2020/0232514 A1    Jul. 23, 2020

(30) Foreign Application Priority Data

Jan. 23, 2019  (JP) .............................. JP2019-009795

(51) Int. Cl.
| | | |
|---|---|---|
| *F16D 3/223* | (2011.01) | |
| *F16D 3/2237* | (2011.01) | |
| *F16D 3/2233* | (2011.01) | |

(52) U.S. Cl.
CPC ......... *F16D 3/2237* (2013.01); *F16D 3/2233* (2013.01); *F16D 2003/22306* (2013.01); *F16D 2003/22309* (2013.01); *Y10S 464/906* (2013.01)

(58) Field of Classification Search
CPC .................. F16D 3/2237; F16D 3/2233; F16D 2003/22306; F16D 2003/22309; Y10S 464/906

USPC ......................................................... 464/145
See application file for complete search history.

(56) References Cited

U.S. PATENT DOCUMENTS

| | | | |
|---|---|---|---|
| 9,133,888 B2* | 9/2015 | Gremmelmaier | ......... F16D 3/24 |
| 2004/0137991 A1 | 7/2004 | Weckerling | |
| 2014/0206463 A1 | 7/2014 | Gremmelmaier et al. | |

FOREIGN PATENT DOCUMENTS

| | | |
|---|---|---|
| CN | 103946571 A | 7/2014 |
| JP | 2004-169915 A | 6/2004 |

OTHER PUBLICATIONS

U.S. Appl. No. 16/680,892, filed Nov. 12, 2019 in the name of Shinoda et al.

* cited by examiner

*Primary Examiner* — Greg Binda
(74) *Attorney, Agent, or Firm* — Oliff PLC

(57) ABSTRACT

A constant-velocity universal joint including a generally cup-shaped outer joint member and an inner joint member that define first and second groove portions. A pinch angle by which a ball is pinched in the first groove portion is open toward an opening of the outer joint member. A pinch angle by which the ball is pinched in the second groove is open toward a bottom of the outer joint member. An absolute value of the pinch angle in a larger-pinch-angle groove portion that is one of the first and second groove portions, is larger than an absolute value of the pinch angle in a smaller-pinch-angle groove portion that is the other of the first and second groove portions in a reference state. A radial clearance in the smaller-pinch-angle groove portion is larger than a radial clearance in the larger-pinch-angle groove portion when torque is not transmitted in the reference state.

3 Claims, 10 Drawing Sheets

CONSTANT-VELOCITY UNIVERSAL JOINT

This application claims priority from Japanese Patent Application No. 2019-009795 filed on Jan. 23, 2019, the disclosure of which is herein incorporated by reference in its entirety.

FIELD OF THE INVENTION

The present invention in general relates to a constant-velocity universal joint, more particularly, to an improvement of a constant-velocity universal joint in which two types of groove portions, i.e., first and second groove portions are alternately arranged about a centerline, wherein a radial distance between an outer track groove and an inner track groove, which cooperate to pinch a ball, is increased in one of axially opposite directions in the first groove portion and is increased in the other of the axially opposite directions in the second groove portion.

BACKGROUND OF THE INVENTION

There is known a constant-velocity universal joint including (a) a generally cup-shaped outer joint member having a plurality of outer track grooves provided in an inner circumferential surface thereof, (b) an inner joint member having a plurality of inner track grooves provided in an outer circumferential surface thereof, and disposed inside the outer joint member; (c) a plurality of balls interposed between the outer track grooves and the inner track grooves, so as to transmit a torque between the outer joint member and the inner joint member; and (e) a generally annular-shaped cage disposed between the outer joint member and the inner joint member, and having a plurality of pockets holding therein the balls. The known constant-velocity universal joint is widely used as, for example, a drive-force transmitting device for as a front wheel axle of a vehicle and a rotation transmitting device for various kinds of machines other than a vehicle. As such a constant-velocity universal joint, there is proposed a constant-velocity universal joint of so-called "counter-track type" in which the outer track grooves and the inner track grooves cooperate to define a plurality groove portions, such that each of the balls is disposed in a corresponding one of the groove portions and is pinched between a corresponding one of the outer track grooves and a corresponding one of the inner track grooves, wherein each of the balls is substantially in contact at outer and inner contact points with a corresponding one of the outer track grooves and a corresponding one of the inner track grooves, respectively, wherein an outer tangent plane that is tangent at the outer contact point and an inner tangent plane that is tangent at the inner contact point cooperate with each other to define a pinch angle. The groove portions include at least one first groove portion in which a radial distance between a corresponding one of the outer track grooves and a corresponding one of the inner track grooves in a radial direction of the outer joint member is generally increased in a direction toward an opening end of the outer joint member in a reference state in which centerlines of the outer joint member and the inner joint member lie in a straight line with a joint angle defined by the centerlines being 0 degree. The groove portions include, in addition to the at least one first groove portion, at least one second groove portion in which a radial distance between a corresponding one of the outer track grooves and a corresponding one of the inner track grooves in the radial direction is generally reduced in the direction toward the opening end of the outer joint member in the reference state. The at least one first groove portion and the at least one second groove portion are alternately arranged about the centerlines in the reference state (see JP2004-169915A). It is noted that the outer joint member and the inner joint member are also known as "outer race" and "inner race", respectively.

SUMMARY OF THE INVENTION

In the above-described constant-velocity universal joint, where the first groove portion and the second groove portion are different from each other in terms of an absolute value of the pinch angle in the reference state, the cage is displaced in a displacement direction that eliminates play when a load is applied to the outer and inner joint members, namely, when the torque is transmitted between the outer and inner joint members, wherein the displacement direction is dependent on a larger-pinch-angle groove portion (that is one of the first and second groove portions) in which the absolute value of the pinch angle is larger than in a smaller-pinch-angle groove portion (that is the other of the first and second groove portions), so that a radial clearance between the smaller-pinch-angle groove portion and the ball disposed in the smaller-pinch-angle groove portion, namely, radial play of the ball in the smaller-pinch-angle groove portion, is made small whereby a ball/groove surface pressure acting between the ball and the smaller-pinch-angle groove portion is increased. Such an increase of the ball/groove surface pressure leads to problematic reductions of durability and torque-transmission efficiency. That is, when the load is applied to the outer and inner joint members, a pressing force (see "Fa", "Fb" in FIG. 7) applied to the ball is made larger as the absolute value of the pinch angle is larger, so that the cage is displaced together with the ball disposed in the larger-pinch-angle groove portion, in the above-described displacement direction so as to eliminates the play. Thus, the ball disposed in the larger-pinch-angle groove portion is displaced in a direction in which the pinch angle is open, namely, in a direction in which a radial distance between the outer and inner track grooves is increased whereby the radial clearance is increased in the larger-pinch-angle groove portion, while the ball disposed in the smaller-pinch-angle groove portion is displaced in a direction in which the pinch angle is closed, namely, in a direction in which the radial distance between the outer and inner track grooves is reduced whereby the radial clearance is reduced in the smaller-pinch-angle groove portion. Since the first and the second groove portions, namely, the larger-pinch-angle and smaller-pinch-angle groove portions are substantially the same as each other in terms of the radial clearance, in general, the radial clearance in the smaller-pinch-angle groove portion made smaller than the radial clearance in the larger-pinch-angle groove portion when the load is applied to the outer and inner joint members. It is noted that the cage is attached to one of the outer and inner joint members such that the cage has a certain degree of play in directions parallel to an axis of the cage, for thereby permitting a posture of the cage to be changed relative to the outer and inner joint members, with change of the joint angle. Therefore, where the first groove portion and the second groove portion are substantially the same as each other in terms of the absolute value of the pinch angle in the reference state, the first groove portion and the second groove portion are substantially the same as each other also in terms of a magnitude of the pressing force applied to the ball, so that the cage is held in its neutral position without the cage being displaced to eliminate the play and accordingly the radial clearance in each groove portion is not substantially changed.

FIG. 12 is a view for explaining change of the radial clearance in the first and second groove portions 30, 32 in a constant-velocity universal joint 80 in which the first groove portion 30 is the larger-pinch-angle groove portion while the second groove portion 32 is the smaller-pinch-angle groove portion, namely, in which the absolute value αabs of the pinch angle α of the first groove portion 30 is larger than the absolute value βabs of the pinch angle β of the second groove portion 32. In absence of the load, as indicated in "(a) IN ABSENCE OF LOAD" of FIG. 12, the radial clearance Ca1 corresponding to a radial distance between a ball locus (movement path of a center of the ball) La1 defined by the first outer track groove 20a and a ball locus La2 defined by the first inner track groove 22a in the first groove portion 30 and the radial clearance Cb1 corresponding to a radial distance between a ball locus Lb1 defined by the second outer track groove 20b and a ball locus Lb2 defined by the second inner track groove 22b in the second groove portion 30 are substantially equal to each other. Each of the radial clearances Ca1, Cb1 has to be not smaller than a minimum amount that is minimally required to enable the torque (rotation) to be transmitted between the outer and inner joint members 12, 14 through the balls 24, and to enable the balls 24 to be smoothly rolled upon change of the joint angle.

On the other hand, in presence of the load, as indicated in "(b) IN PRESENCE OF LOAD" of FIG. 12, the pressing force Fa (see FIG. 7) applied to the ball 24 in the first groove portion 30 as the larger-pinch-angle groove portion is larger in magnitude than the pressing force Fb (see FIG. 7) applied to the ball 24 in the second groove portion 32 as the smaller-pinch-angle groove portion, so that the cage 26 is displaced together with the ball 24, by a distance H corresponding to the play, in the direction in which the pinch angle α is open, i.e., in rightward direction as seen in FIG. 12, so as to eliminate the play, whereby the radial clearance Ca2 in the first groove portion 30 is made larger than in the absence of the load while the radial clearance Cb2 in the second groove portion 32 is made smaller than in the absence of the load. FIG. 12 shows a case in which there is play of support members such as bearings in addition to the play of the cage 26, so that the inner joint member 14 is displaced relative to the outer joint member 12 by a distance h corresponding to the play of the support members whereby the radial clearances Ca2, Cb2 are further increased and reduced, respectively. That is, a reaction force applied from each ball 24 acts in a direction opposite to a direction of a corresponding one of the pressing forces Fa, Fb, and the reaction force applied from the ball 24 disposed in the first groove portion 30 as the larger-pinch-angle groove portion is larger than the reaction force applied from the ball 24 disposed in the second groove portion 32 as the smaller-pinch-angle groove portion because the pressing force Fa is larger than the pressing force Fb. Thus, the inner joint member 14 is displaced relative to the outer joint member 12 in leftward direction as seen in FIG. 12, i.e., in a direction toward a bottom wall of the outer joint member 12.

FIG. 13 is a view showing the ball/groove surface pressure acting on an outer side part (i.e., the second outer track groove 20b) of the second groove portion 32 and the ball/groove surface pressure acting on an inner side part (i.e., the second inner track groove 22b) of the second groove portion 32, in an arrangement in which the absolute value αabs of the pinch angle α and the absolute value βabs of the pinch angle β are equal to each other (αabs=βabs) so that the plays are not eliminated even in presence of the load, and in another arrangement in which the absolute value αabs of the pinch angle α is larger than the absolute value βabs of the pinch angle β (αabs>βabs) so that the plays are eliminated in presence of the load, in a comparative manner. As shown in FIG. 13, when the plays are eliminated, the ball/groove surface pressure is increased on both of the outer and inner side parts of the second groove portion 32.

The present invention was made in view of the background art described above. It is therefore an object of the present invention to provide a constant-velocity universal joint in which two types of groove portions, i.e., first and second groove portions are alternately arranged about a centerline, wherein a pinch angle by which a ball is pinched in the first groove portion is open in one of opposite directions while the pinch angle in the second groove portion is open in the other of the opposite directions, wherein an absolute value of the pinch angle of the first groove portion and an absolute value of the pinch angle of the second groove portion are different from each other, and wherein a radial clearance in each groove portion is kept not smaller than a minimum amount in presence of a load.

The above-described object indicated above is achieved according to the following aspects of the present invention.

According to a first aspect of the invention, there is provided a constant-velocity universal joint that includes a generally cup-shaped outer joint member having a plurality of outer track grooves provided in an inner circumferential surface of the outer joint member, an inner joint member having a plurality of inner track grooves provided in an outer circumferential surface of the inner joint member, the inner joint member being disposed inside the outer joint member. The universal joint can also include a plurality of balls interposed between the outer track grooves and the inner track grooves, so as to transmit a torque between the outer joint member and the inner joint member; and a generally annular-shaped cage disposed between the outer joint member and the inner joint member, and having a plurality of pockets holding therein the balls. The outer track grooves and the inner track grooves can cooperate to define a plurality groove portions, such that each of the balls is disposed in a corresponding one of the groove portions, wherein each of the balls, which is disposed in a corresponding one of the groove portions, is pinched between one of the outer track grooves and one of the inner track grooves that cooperate with each other to define the corresponding one of the groove portions, and is substantially in contact at outer and inner contact points with the one of the outer track grooves and the one of the inner track grooves, respectively. An outer tangent plane that is tangent to each of the balls at the outer contact point and an inner tangent plane that is tangent to each of the balls at the inner contact point can cooperate with each other to define a pinch angle at an intersection of the outer tangent plane and the inner tangent plane, and the groove portions can include a first groove portion in which a radial distance between a corresponding one of the outer track grooves and a corresponding one of the inner track grooves in a radial direction of the outer joint member is generally increased in a direction toward an opening end of the outer joint member in a reference state in which centerlines of the outer joint member and the inner joint member lie in a straight line with a joint angle defined by the centerlines being zero degrees. The groove portions can include a second groove portion in which a radial distance between a corresponding one of the outer track grooves and a corresponding one of the inner track grooves in the radial direction is generally reduced in the direction toward the opening end of the outer joint member in the reference state, and the first groove portion and the second groove portion can be alternately arranged about the centerlines. One of the first groove portion and the second groove portion has a larger-pinch-angle groove portion while the other of the first groove portion and the second groove portion has a smaller-pinch-angle groove portion, such that an absolute value of the pinch angle of the larger-pinch-angle groove portion is larger than an absolute value of the pinch angle of the smaller-pinch-angle groove portion in the reference state. The cage can contact one of the outer joint member and the inner joint member such that the cage has play in directions parallel to an axis of the cage, and when the torque is not transmitted between the outer joint member and the inner joint member through the balls in the reference state, a radial clearance between the smaller-pinch-angle groove portion and a corresponding one of the balls disposed in the smaller-pinch-angle groove portion can be larger than a radial clearance between the larger-pinch-angle groove portion and a corresponding one of the balls disposed in the larger-pinch-angle groove portion. It is noted that the above-described feature that "each of the balls is substantially in contact at outer and inner contact points with the one of the outer track grooves and the one of the inner track grooves, respectively," may be interpreted to mean that each of the balls is substantially in contact at the outer and inner contact points with the outer and inner track grooves, respectively, with a small radially outer clearance between the outer contact point and the outer track groove and/or a small radially inner clearance between the inner contact point and the inner track groove.

In the constant-velocity universal joint according to the first aspect of the invention, the absolute value of the pinch angle the first groove portion and the absolute value of the pinch angle of the second groove portion are different from each other in the reference state, so that the cage is displaced in a displacement direction that eliminates the play of the cage when load is applied to the outer and inner joint members, namely, when the torque is transmitted between the outer and inner joint members, wherein the displacement direction is dependent on the larger-pinch-angle groove portion (that is one of the first and second groove portions) in which the absolute value of the pinch angle is larger than in the smaller-pinch-angle groove portion (that is the other of the first and second groove portions). With displacement of the cage in the displacement direction, the radial clearance between the larger-pinch-angle groove portion and the ball disposed in the larger-pinch-angle groove portion is made larger than in absence of the load, while the radial clearance between the smaller-pinch-angle groove portion and the ball disposed in the smaller-pinch-angle groove portion is made smaller than in absence of the load. However, when the load is not applied to the outer and inner joint members, namely, when the torque is not transmitted between the outer and inner joint members, the radial clearance between the smaller-pinch-angle groove portion and the ball disposed in the smaller-pinch-angle groove portion is larger than the radial clearance between the larger-pinch-angle groove portion and the ball disposed in the larger-pinch-angle groove portion. Therefore, when the torque is transmitted between the outer and inner joint members, the radial clearance between the larger-pinch-angle groove portion and the ball disposed in the larger-pinch-angle groove portion and the radial clearance between the smaller-pinch-angle groove portion and the ball disposed in the smaller-pinch-angle groove portion are increased and reduced, respectively, by displacement of the cage in the displacement direction that eliminates the play of the cage, so that both of the radial clearance between the larger-pinch-angle groove portion and the ball disposed in the larger-pinch-angle groove portion and the radial clearance between the smaller-pinch-angle groove portion and the ball disposed in the smaller-pinch-angle groove portion can be kept within desired ranges.

DETAILED DESCRIPTION OF PREFERRED EMBODIMENT

Figure 1:
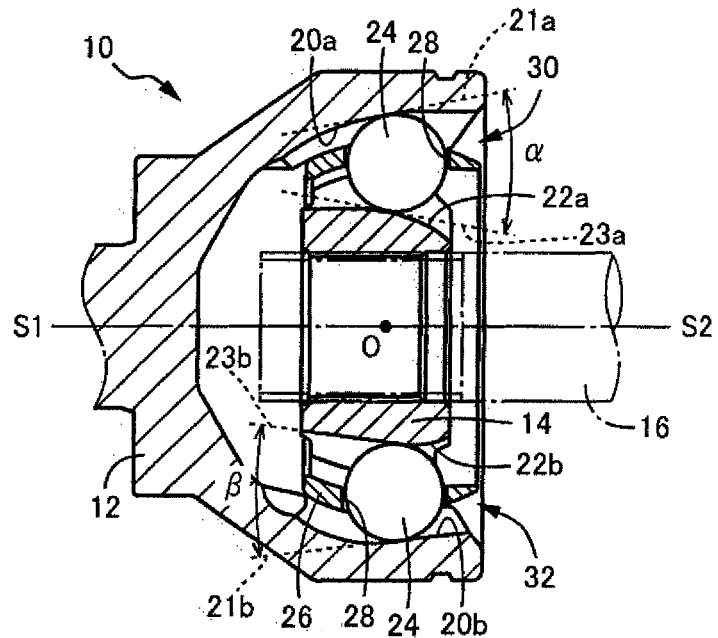
FIG. 1 is a cross sectional view of a constant-velocity universal joint constructed according to an embodiment of the present invention, wherein the cross sectional view is taken in a plane containing an axis of the constant-velocity universal joint.

The constant-velocity universal joint of the present invention is applied to, for example, a drive-force transmitting device for an axle of front wheels as steerable wheels of a vehicle, and also a rotation transmitting device for various kinds of machines other than a vehicle. It is preferable that the first and second groove portions are arranged about centerlines of the outer and inner joint members and are equi-angularly spaced apart from each other. The number of the groove portions is preferably an even number, for example, six or more. The absolute value of each of the pinch angles of the first and second groove portions in the reference state is preferably within a range from about 10 degrees to about 25 degrees, for example, although the absolute value may be smaller than 10 degrees or larger than 25 degrees. It is preferable that the pinch angle, which is defined between the outer and inner track grooves, is open substantially evenly radially outwardly and radially inwardly. However, the pinch angle may be open mainly radially outwardly or mainly radially inwardly. The present invention is advantageously applicable to an arrangement in which there is play of support members such as bearings in addition to the play of the cage so that the radial clearances are further changed depending on whether the load is present or absent. However, the present invention is applicable also to an arrangement in which the play of support members such as bearings is substantially zero. The play of the cage does not necessarily have to be provided by a measurable gap or clearance but may be provided by an elastic deformation of the cage which is caused by application a pressing force based on the pinch angle and which causes displacement of the ball held in the cage.

For example, according to an embodied form of the present invention, (a) at least one first groove portion as the above-described first groove portion and at least one second groove portion as the above-described second groove portion are located in respective positions that are symmetrical with respect to the centerlines, (b) the first groove portion is the larger-pinch-angle groove portion while the second groove portion is the smaller-pinch-angle groove portion, and (c) the radial clearance between the second groove portion and a corresponding one of the balls disposed in the second groove portion is larger than the radial clearance between the first groove portion and a corresponding one of the balls disposed in the first groove portion when the torque is not transmitted between the outer joint member and the inner joint member through the balls in the reference sate. Each ball receives the pressing force whose magnitude is dependent on the pinch angle by which the ball is pinched by the outer and inner track grooves. Thus, when the joint angle is to be changed (i.e., when the joint is to be bent and is to be returned from being bent), the cage is smoothly pivoted owing to the pressing force applied to at least one of the balls, and the other ball or balls (to which the pressing force is not applied) are moved by the cage, so that the joint angle is smoothly changed. However, depending on the joint angle and a phase of the constant-velocity universal joint about the centerlines upon change of the joint angle, the pressing force applied to the balls cannot be obtained sufficiently, so that there is a possibility of generation of noise or the like caused by, for example, resistance to pivot movement of the cage and delay of the pivot movement of the cage. In the embodied form of the present invention, the absolute value of the pinch angle of the first groove portion as the larger-pinch-angle groove portion is larger than the absolute value of the pinch angle of the second groove portion as the smaller-pinch-angle groove portion in the reference state, so that the pressing force applied to the ball by the pinch angle in the first groove portion is made large. Therefore, even in a range of the joint angle in which a sufficiently large pressing force cannot be obtained by the pinch angle in the first groove portion in a conventional constant-velocity universal joint, the pressing force applied to the ball in the first groove portion is made sufficiently large whereby the cage can be smoothly pivoted by movement of the ball by the pressing force applied to the ball.

In the above-described embodied form, it is preferable that the absolute value of the pinch angle in the first groove portion is larger than the absolute value of the pinch angle in the second groove portion by, for example, a range from 2 degrees to 10 degrees in the reference state. Further, when the constant-velocity universal joint is bent within a plane containing the first groove portion, it is preferable that the pinch angle in the first groove portion is maintained irrespective of the joint angle, such that the value of the pinch angle in the first groove portion is positive, namely, the radial distance between a corresponding one of the outer track grooves and a corresponding one of the inner track grooves in the first groove portion is generally increased in the direction toward the opening end of the outer joint member, and such that the absolute value of the pinch angle in the first groove portion is larger than the absolute value of the pinch angle in the second groove portion in the reference state. Still further, it is preferable that each of the outer track grooves of the first and second groove portions has a bottom that includes a straight portion defined by a straight line in the cross section containing the centerline of the outer joint member, wherein the outer contact point lies in the straight portion of the bottom of each of the outer track grooves at least in a small bending region, namely, at least when the joint angle is not larger than 5 degrees, and that each of the inner track grooves of the first and second groove portions has a bottom that includes a straight portion defined by a straight line in the cross section containing the centerline of the inner joint member, wherein the inner contact point lies in the straight portion of the bottom of each of the inner track grooves at least in the small bending region. Moreover, it is preferable that the total number of the groove portions consisting of the first and second groove portions is six or ten.

The present invention may be carried out in a form that is different from the above-described embodied form. For example, the at least one first groove portion may consist of a plurality of first groove portions that are located in respective positions that are symmetrical with respect to the centerlines, while the at least one second groove portion may consist of a plurality of second groove portions that are located in respective positions that are symmetrical with respect to the centerlines. Further, the first groove portion may be the smaller-pinch-angle groove portion while the second groove portion may be the larger-pinch-angle groove portion, so that the absolute value of the pinch angle of the first groove portion is smaller than the absolute value of the pinch angle of the first groove portion in the reference state. In this arrangement, when the torque is not transmitted between the outer and inner joint members through the balls in the reference sate, the radial clearance between the first groove portion and a corresponding one of the balls disposed in the first groove portion is larger than the radial clearance between the second groove portion and a corresponding one of the balls disposed in the second groove portion. Still further, if a difference between the absolute value of the pinch angle of the larger-pinch-angle groove portion and the absolute value of the pinch angle of the smaller-pinch-angle groove portion, is larger than 10 degrees, the posture of the cage could be unstable. However, the difference may be larger than 10 degrees as long as there is no issue such as lack of stability in the posture of the cage. Moreover, it is preferable that each of the outer track grooves of the first and second groove portions has a bottom that includes a straight portion defined by a straight line in the cross section containing the centerline of the outer joint member, wherein the outer contact point lies in the straight portion of the bottom of each of the outer track grooves at least in a small bending region, namely, at least when the joint angle is not larger than 5 degrees, and that each of the inner track grooves of the first and second groove portions has a bottom that includes a straight portion defined by a straight line in the cross section containing the centerline of the inner joint member, wherein the inner contact point lies in the straight portion of the bottom of each of the inner track grooves at least in the small bending region, from a point of view of better accuracy of the pinch angle and better machinability. However, the bottom of each of the outer and inner track grooves of the first and second groove portions may include a non-straight portion defined by a curved line such as an arcuate line in the cross section, such that the outer or inner contact point lies in the non-straight portion in the small bending region including 0 degree of the joint angle. In this arrangement, too, the pinch angle is defined between two tangent planes that are the outer tangent plane that is tangent to each of the balls at the outer contact point and the inner tangent plane that is tangent to each of the balls at the inner contact point.

Embodiment

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Figure 2:
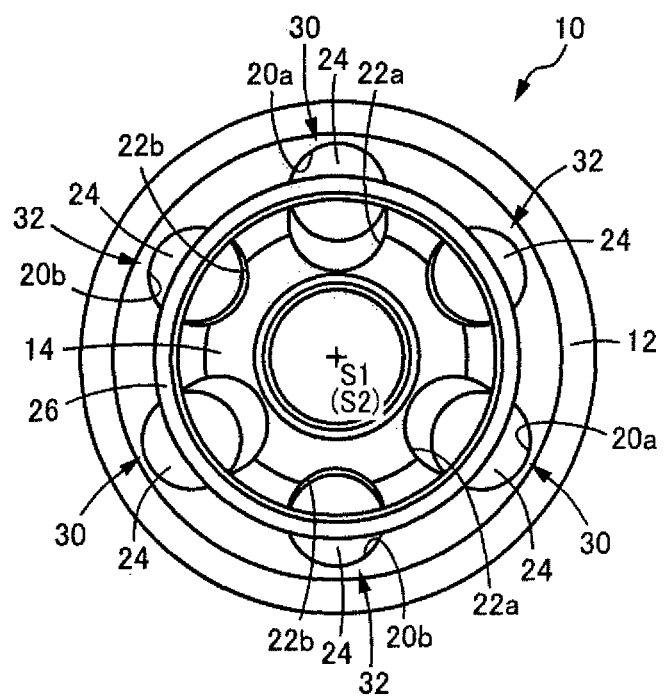
FIG. 2 is a side view of the constant-velocity universal joint of FIG. 1, wherein the side view is as seen from right side of FIG. 1.

FIG. 1 is a cross sectional view of a constant-velocity universal joint 10 constructed according to an embodiment of the present invention, wherein the cross sectional view is taken in a plane containing an axis (corresponding centerlines S1, S2) of the constant-velocity universal joint 10. FIG. 2 is a side view that is seen from right side of FIG. 1. This constant-velocity universal joint 10 is to be used, for example, for an axle of front wheels as steerable wheels of a vehicle, and includes an outer joint member 12 and an inner joint member 14 to which a shaft 16 is connected through splines or the like in a drive-force transmittable manner. The views of FIGS. 1 and 2 show a reference state of the constant-velocity universal joint 10 in which a centerline S1 of the outer joint member 12 and a centerline S2 of the inner joint member 14 are aligned with each other, namely, lie in a straight line with a joint angle Φ being 0 degree. In this constant-velocity universal joint 10, a maximum value of the joint angle Φ (i.e., maximum angle value by which the joint 10 can be bent) is at least 40 degrees, and is about 46 degrees in the present embodiment. The joint angle Φ is an angle of intersection of the centerline S1 and the centerline S2. The joint angle Φ is 0 degree in the reference state in which the centerlines S1, S2 lie in a straight line.

The outer joint member 12 is a generally cup-shaped member (semi-spherical shaped member), and has a plurality of outer track grooves 20 provided in its inner circumferential surface. The outer track grooves 20 are arranged about the centerline S1 and are substantially equi-angularly spaced apart from each other. The outer track grooves 20 consist of a plurality of first outer track grooves 20a and a plurality of second outer track grooves 20b. In the present embodiment, the outer track grooves 20 consist three first outer track grooves 20a and three second outer track grooves 20b such that the first and second outer track grooves 20a, 20b are alternately arranged about the centerline S1. It is noted that the first and second outer track grooves 20a, 20b will be simply referred to as outer track grooves 20 unless they are to be distinguished. Meanwhile, the inner joint member 14 is disposed radially inside the generally cup-shaped outer joint member 12, and has a plurality of inner track grooves 22 provided in its outer circumferential surface. The inner track grooves 22 are arranged about the centerline S2 and are substantially equi-angularly spaced apart from each other. The inner track grooves 22 consist of a plurality of first inner track grooves 22a and a plurality of second inner track grooves 22b. In the present embodiment, the inner track grooves 22 consist three first inner track grooves 22a and three second inner track grooves 22b such that the first and second inner track grooves 22a, 22b are alternately arranged about the centerline S2. It is noted that the first and second inner track grooves 22a, 22b will be simply referred to as inner track grooves 22 unless they are to be distinguished.

Each of the first outer track grooves 20a is provided to be opposed to a corresponding one of the first inner track grooves 22a in a radial direction of the constant-velocity universal joint 10, such that a ball 24 is interposed between the first outer and inner track grooves 20a, 22a that are opposed to each other in the radial direction, so as to transmit a torque (rotation) between the outer and inner joint members 12, 14 through the ball 24 interposed between the mutually opposed first outer and inner track grooves 20a, 22a. The ball 24 is pinched between the first outer and inner track grooves 20a, 22a, and is substantially in contact at outer and inner contact points with the first outer and inner track grooves 20a, 22a, respectively. Similarly, each of the second outer track grooves 20b is provided to be opposed to a corresponding one of the second inner track grooves 22b in a radial direction of the constant-velocity universal joint 10, such that the ball 24 is interposed between the second outer and inner track grooves 20b, 22b that are opposed to each other in the radial direction, so as to transmit the torque between the outer and inner joint members 12, 14 through the ball 24 interposed between the mutually opposed second outer and inner track grooves 20b, 22b. The ball 24 is pinched between the second outer and inner track grooves 20b, 22b, and is substantially in contact at outer and inner contact points with the second outer and inner track grooves 20b, 22ba, respectively. In an annular-shaped space defined between the outer and inner joint members 12, 14, an annular-shaped cage 26 is provided to be pivotable about a joint center O. The annular-shaped cage 26 has six pockets (openings) 28 that are provided to be substantially equi-angularly spaced apart from each other, such that the balls 24 are held in the respective pockets 28. The cage 26 has a spherical-shaped outer circumferential surface, and is held by the outer joint member 12 with the spherical-shaped outer circumferential surface being slidably fitted in the inner circumferential surface of the outer joint member 12.

Each of the first outer track grooves 20a and the corresponding one of the first inner track grooves 22a, which are opposed to each other in the radial direction, constitute a first groove portion 30, while each of the second outer track grooves 20b and the corresponding one of the second inner track grooves 22b, which are opposed to each other in the radial direction, constitute a second groove portion 32. The first and second groove portions 30, 32 are alternately arranged about the centerlines S1, S2. In the present embodiment in which the total number of the groove portions 30, 32 is six, each of the first groove portions 30 and a corresponding one of the second groove portions 32 are located in respective positions that are symmetrical with respect to the centerlines S1, S2, as shown in FIG. 2.

Figure 7:
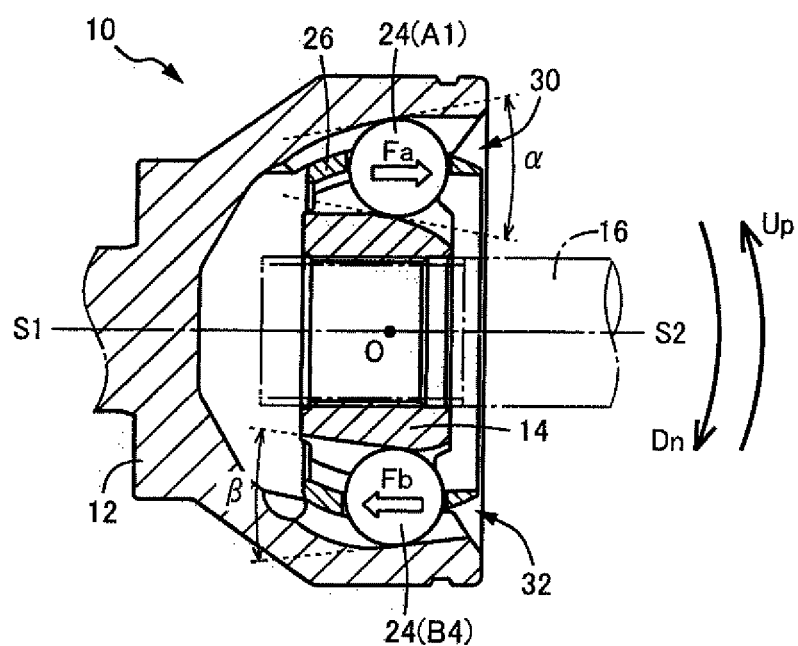
FIG. 7 is a view for explaining a pressing force Fa applied to a ball A1, based on a pinch angle $\alpha$ in the first groove portion, and a pressing force Fb applied to a ball B4, based on a pinch angle $\beta$ in the second groove portion, in the constant-velocity universal joint of FIG. 1.
Figure 9:
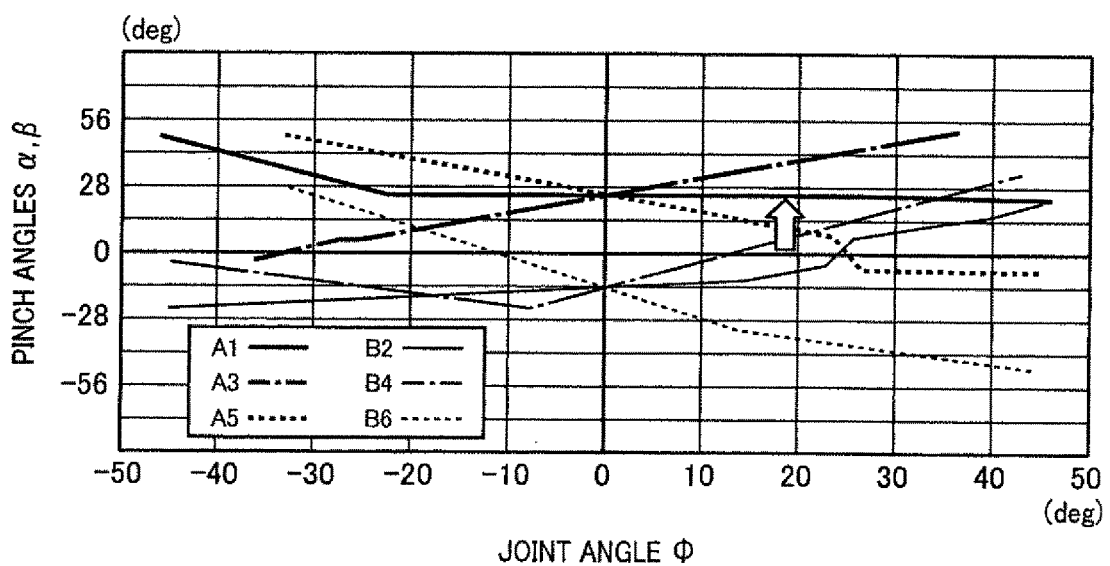
FIG. 9 is a view showing characteristics of changes of the pinch angles $\alpha$, $\beta$ of the six balls A1, A3, A5, B2, B4, B6 shown in FIG. 8, in relation with the joint angle $\Phi$.

In the reference state shown in FIGS. 1 and 2, a pinch angle α in each first groove portion 30, namely, the pinch angle α, by which the ball 24 is pinched between the first outer and inner track grooves 20a, 22a, is a positive value so as to open toward an opening end of the cup-shaped outer joint member 12 (rightward as seen in FIG. 1). That is, in each first groove portion 30, a radial distance between the first outer and inner track grooves 20a, 22a in a radial direction of the outer joint member 12 is generally increased in a direction toward the opening end of the outer joint member 12 in the reference state. The pinch angle α is defined as an angle of intersection of an outer tangent plane 21a that is tangent to the ball 24 at the above-described outer contact point and an inner tangent plane 23a that is tangent to the ball 24 at the above-described inner contact point. That is, the pinch angle α is an angle of the inner tangent plane 23a relative to the outer tangent plane 21a. Meanwhile, a pinch angle β in each second groove portion 32, namely, the pinch angle β, by which the ball 24 is pinched between the second outer and inner track grooves 20b, 22b, is a negative value so as to open toward a bottom wall of the cup-shaped outer joint member 12 (leftward as seen in FIG. 1). That is, in each second groove portion 32, a radial distance between the second outer and inner track grooves 20b, 22b in the radial direction is generally reduced in the direction toward the opening end of the outer joint member 12 in the reference state. The pinch angle β is defined as an angle of intersection of an outer tangent plane 21b that is tangent to the ball 24 at the above-described outer contact point and an inner tangent plane 23b that is tangent to the ball 24 at the above-described inner contact point. That is, the pinch angle β is an angle of the inner tangent plane 23b relative to the outer tangent plane 21b. In the reference state, an absolute value αabs of the pinch angle α is larger than an absolute value βabs of the pinch angle β by 2-10 degrees. In the present embodiment, the absolute value αabs of the pinch angle α is larger than the absolute value βabs of the pinch angle β by 8 degrees. Specifically, the pinch angle α is in a range between 15 degrees and 25 degrees, and is about 22 degrees, for example. The pinch angle β is in a range of between −10 degrees and −20 degrees, and is about −14 degrees, for example. The pinch angle α is changed with change of the joint angle Φ. In the present embodiment, as shown in FIG. 7, when the constant-velocity universal joint 10 is bent within a plane containing the first groove portion 30, the absolute value αabs of the pinch angle α is always larger than the absolute value βabs (14 degrees) of the pinch angle β in the reference state, irrespective of the joint angle Φ. As shown in FIG. 9 in which the pinch angle α of the ball 24 (A1) in one of the first groove portions 30 that is located in an upper portion of FIG. 1 is represented by thick solid line, the pinch angle α of the ball 24 (A1) is larger than 14 degrees and is kept to be not smaller than about 20 degrees throughout an entire range of the joint angle Φ. That is, bottoms of the first outer and inner track grooves 20a, 22a in the axial cross section, which define to the pinch angle α, have respective shapes that cooperate to keep the pinch angle α not smaller than about 20 degrees, irrespective of the joint angle Φ.

Figure 3:
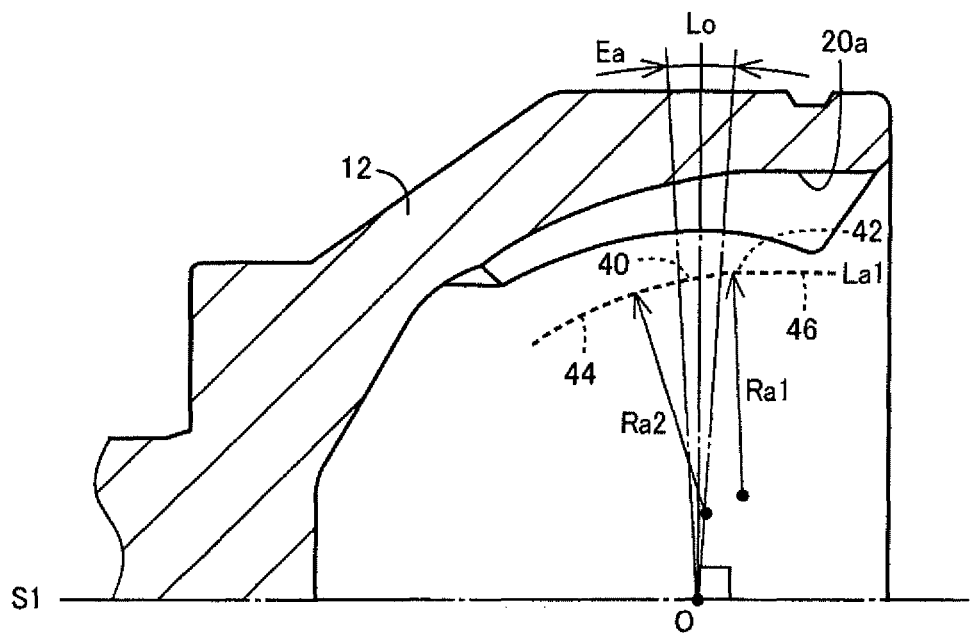
FIG. 3 is a cross sectional view of an outer joint member of the constant-velocity universal joint of FIG. 1, particularly, a portion of a first outer track groove of the outer joint member, which constitutes a first groove portion, for explaining a shape of a bottom of the first outer track groove in its longitudinal direction.

FIG. 3 is a view for specifically explaining a shape of the bottom of the first outer track groove 20a in the axial cross section, i.e., in a cross section taken in a plane containing the centerline S1 that is parallel with a longitudinal direction of the first outer track groove 20a. In FIG. 3, broken line indicates a ball locus La1 that is a movement path along which a center of the ball 24 is to be moved. The shape of the bottom of the first outer track groove 20a is dependent on the ball locus La1. The ball locus La1 includes an inclined straight portion 40, arcuate portions 42, 44 and a parallel straight portion 46. The inclined straight portion 40 corresponds to a normal region (small bent region) Ea in which the joint angle Φ is not larger than 7 degrees (namely, −7 degrees≤Φ≤+7 degrees). The arcuate portions 42, 44 are smoothly connected to respective opposite ends of the inclined straight portion 40, and have respective radii Ra1, Ra2. The parallel straight portion 46 is parallel with the centerline S1, and is smoothly connected to one of opposite ends of the arcuate portion 42, which is on right side in FIG. 3, namely, which is on the side of the opening end of the cup-shaped outer joint member 12. The normal region Ea corresponds to a range of 7 degrees, and consist of two regions, wherein one of the two regions corresponds to a range of 3.5 degrees located on one of opposite sides of a perpendicular line Lo passing through the joint center O, and the other of the two regions corresponds to another range of 3.5 degrees located on the other of the opposite sides of the perpendicular line Lo. The inclined straight portion 40 defines the pinch angle α in the reference state in which the joint angle Φ is 0 degree. In the present embodiment, the inclined straight portion 40 is inclined radially outwardly by about 11 degrees corresponding to α/2 (i.e., a half of the pinch angle α) such that the inclined straight portion 40 becomes more distant from the centerline S1 in a direction toward the opening end of the cup-shaped outer joint member 12. Both of the radii Ra1, Ra2 of the respective arcuate portions 42, 44 are smaller than a radial distance of the ball locus La1 from the centerline S1. The bottom of the first outer track groove 20a has a radial dimension that is larger than the ball locus La1 by a radius of the ball 24. It is noted that the second outer track groove 20b, which is disposed in the vicinity of the first outer track groove 20a, is not shown in FIG. 3.

Figure 4:
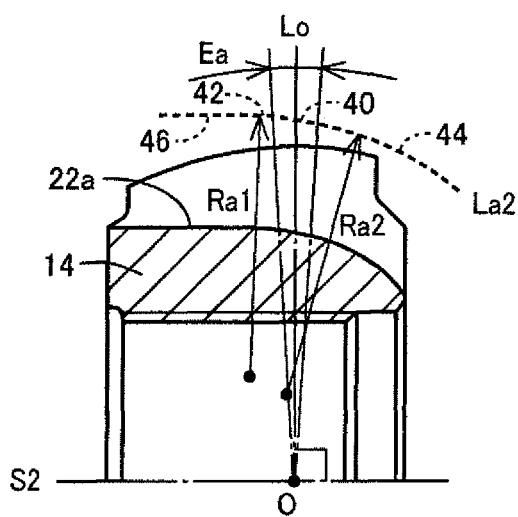
FIG. 4 is a cross sectional view of an inner joint member of the constant-velocity universal joint of FIG. 1, particularly, a portion of a first inner track groove of the inner joint member, which constitutes the first groove portion, for explaining a shape of a bottom of the first inner track groove in its longitudinal direction.

FIG. 4 is a view for specifically explaining a shape of a bottom of the first inner track groove 22a in the axial cross section, i.e., in a cross section taken in a plane containing the centerline S2 that is parallel with a longitudinal direction of the first inner track groove 22a. The shape of the bottom of the first inner track groove 22a is dependent on a ball locus La2 that is indicated by broken line. The ball locus La2 is a mirror image of the ball locus La1, namely, is symmetrical to the ball locus La1 with respect to the perpendicular line Lo, and is the same as the ball locus La1 in that the ball locus La2 includes the inclined straight portion 40, arcuate portions 42, 44 and parallel straight portion 46. The inclined straight portion 40 corresponds to the normal region Ea. The arcuate portions 42, 44 are smoothly connected to respective opposite ends of the inclined straight portion 40, and have respective radii Ra1, Ra2. The parallel straight portion 46 is parallel with the centerline S2, and is smoothly connected to one of opposite ends of the arcuate portion 42, which is on left side in FIG. 4, namely, which is on the side of the bottom wall of the cup-shaped outer joint member 12. The inclined straight portion 40 of the ball locus La2 is inclined radially inwardly by about 11 degrees corresponding to a/2 such that the inclined straight portion 40 becomes closer to the centerline S2 in a rightward direction as seen in FIG. 4, i.e., in a direction toward the opening end of the cup-shaped outer joint member 12. The bottom of the first inner track groove 22a has a radial dimension that is smaller than the ball locus La2 by the radius of the ball 24.

Figure 5:
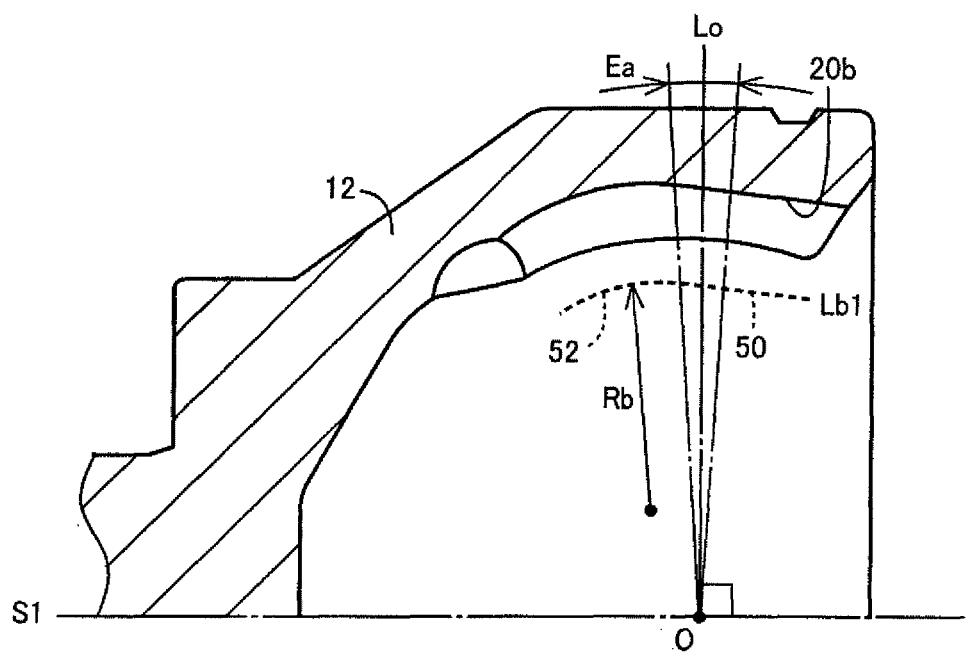
FIG. 5 is a cross sectional view of the outer joint member of the constant-velocity universal joint of FIG. 1, particularly, a portion of a second outer track groove of the outer joint member, which constitutes a second groove portion, for explaining a shape of a bottom of the second outer track groove in its longitudinal direction.

FIG. 5 is a view for specifically explaining a shape of the bottom of the second outer track groove 20b in the axial cross section, i.e., in a cross section taken in a plane containing the centerline S1 that is parallel with a longitudinal direction of the second outer track groove 20b. In FIG. 5, broken line indicates a ball locus Lb1 that is a movement path along which a center of the ball 24 is to be moved. The shape of the bottom of the second outer track groove 20b is dependent on the ball locus Lb1. The ball locus Lb1 includes an inclined straight portion 50 and an arcuate portion 52. The inclined straight portion 50 includes the above-described normal region Ea. The arcuate portion 52 has a radius Rb, and is smoothly connected to a left side end, as seen in FIG. 5, of the inclined straight portion 50, namely, to one of opposite ends of the inclined straight portion 50 wherein the one of the opposite ends is located between the normal region Ea and the bottom wall of the cup-shaped outer joint member 12. The inclined straight portion 50 includes, in addition to the normal region Ea, an extension region that is located on a right side end, as seen in FIG. 5, of the normal region Ea, namely, on one of opposite sides of the normal region Ea wherein the one of the opposite sides is a side of the opening end of the cup-shaped outer joint member 12. The inclined straight portion 50 defines the pinch angle β in the reference state in which the joint angle Φ is 0 degree. In the present embodiment, the inclined straight portion 50 is inclined radially inwardly by about 7 degrees corresponding to an absolute value of (β/2 (i.e., a half of the pinch angle β) such that the inclined straight portion 50 becomes closer to the centerline S2 in a direction toward the opening end of the cup-shaped outer joint member 12. The radius Rb of the arcuate portion 52 is smaller than a radial distance of the ball locus Lb1 from the centerline S1. The bottom of the second outer track groove 20b has a radial dimension that is larger than the ball locus La1 by the radius of the ball 24. It is noted that the first outer track groove 20a, which is disposed in the vicinity of the second outer track groove 20b, is not shown in FIG. 5.

Figure 6:
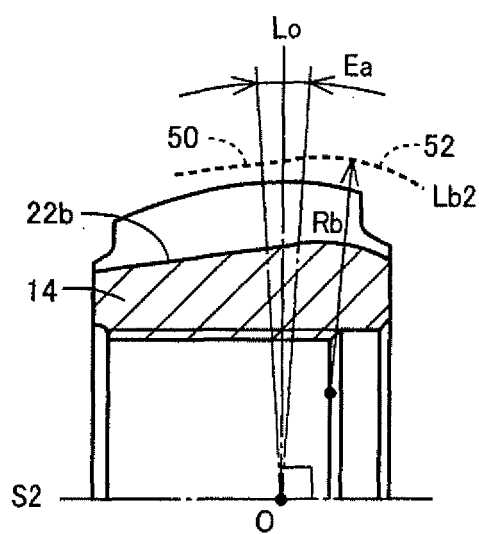
FIG. 6 is a cross sectional view of the inner joint member of the constant-velocity universal joint of FIG. 1, particularly, a portion of a second inner track groove of the inner joint member, which constitutes the second groove portion, for explaining a shape of a bottom of the second inner track groove in its longitudinal direction.

FIG. 6 is a view for specifically explaining a shape of the bottom of the second inner track groove 22b in the axial cross section, i.e., in a cross section taken in a plane containing the centerline S2 that is parallel with a longitudinal direction of the second inner track groove 22b. The shape of the bottom of the second inner track groove 22b is dependent on a ball locus Lb2 that is indicated by broken line. The ball locus Lb2 is a mirror image of the ball locus Lb1, namely, is symmetric to the ball locus Lb1 with respect to the perpendicular line Lo, and is the same as the ball locus Lb1 in that the ball locus Lb2 includes the inclined straight portion 50 and the arcuate portion 52. The inclined straight portion 50 includes the above-described normal region Ea. The arcuate portion 52 has the radius Rb, and is smoothly connected to a right side end, as seen in FIG. 6, of the inclined straight portion 50, namely, to one of opposite ends of the inclined straight portion 50 wherein the one of the opposite ends is located between the normal region Ea and the opening end of the cup-shaped outer joint member 12. The inclined straight portion 50 includes, in addition to the normal region Ea, an extension region that is located on a left side end, as seen in FIG. 6, of the normal region Ea, namely, on one of opposite sides of the normal region Ea wherein the one of the opposite sides is a side of the bottom wall of the cup-shaped outer joint member 12. The inclined straight portion 50 of the ball locus Lb2 is inclined radially outwardly by about 7 degrees corresponding to β/2 such that the inclined straight portion 50 becomes more distant from the centerline S2 in a rightward direction as seen in FIG. 6, i.e., in a direction toward the opening end of the cup-shaped outer joint member 12. The bottom of the second inner track groove 22b has a radial dimension that is smaller than the ball locus Lb2 by the radius of the ball 24.

Figure 8:
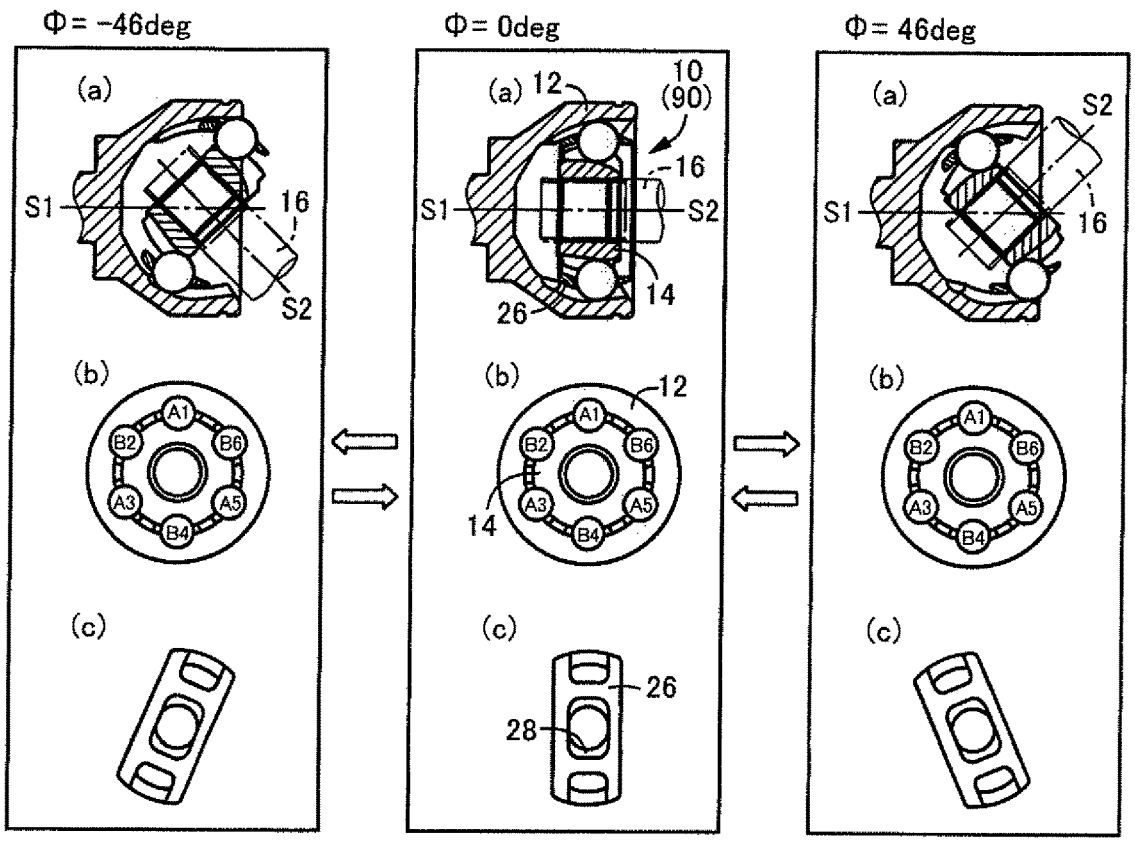
FIG. 8 is a set of views showing cases in which a shaft of the inner joint member of the constant-velocity universal joint of FIG. 1 is to be returned from being pivoted upwardly (toward the first groove portion) and downwardly (toward the second groove portion)

FIG. 7 is a view for explaining a pressing force Fa applied to the ball 24 (A1), based on the pinch angle α in the first groove portion 30, and a pressing force Fb applied to the ball 24 (B4), based on the pinch angle β in the second groove portion 32, in the constant-velocity universal joint 10 of FIG. 1. For distinguishing the six balls 24 from one another, as shown in FIG. 8, three balls 24 disposed in the respective first groove portions 30 will be referred to as balls A1, A3, A5, and other three balls 24 disposed in the respective second groove portions 32 will be referred to as balls B2, B4, B6. The six balls 24 will be referred to as balls A, B or balls 24 where they are not be particularly distinguished from one another. As shown in FIG. 7, the ball A1 disposed in the first groove portion 30 receives the pressing force Fa which is based on the pinch angle α and acts in rightward direction, while the ball B4 disposed in the second groove portion 32 receives the pressing force Fb which is based on the pinch angle β and acts in the leftward direction. When the joint angle Φ is to be changed, namely, when the constant-velocity universal joint 10 is to be bent or to be returned from being bent, the balls 24 are moved based on the pressing forces Fa, Fb whereby the cage 26 is pivoted about the joint center O. Specifically, when the shaft 16 of the inner joint member 14 is to be pivoted downwardly as indicated by arrow Dn, relative to the outer joint member 12, within a plane (corresponding to drawing sheet of FIG. 7) containing the centers of the respective balls A1, B4, namely, about a pivot axis perpendicular to the plane containing the centers of the respective balls A1, B4, the cage 26 is smoothly pivoted about the joint center O owing to movements of the balls 24 based on the pressing forces Fa, Fb. On the other hand, when the shaft 16 of the inner joint member 14 is to be pivoted upwardly as indicated by arrow Up relative to the outer joint member 12 within the above-described plane, the cage 26 has to be pivoted about the joint center O in counterclockwise direction as seen in FIG. 7. However, in this instance, the pressing forces Fa, Fb applied to the respective balls A1, B4 act in a direction opposite to the counterclockwise direction, so that the pressing forces Fa, Fb do not contribute to the pivot movement of the cage 26 in the counterclockwise direction.

When the joint angle $\Phi$ is changed, the pinch angles $\alpha$, $\beta$ are changed with the change of the joint angle $\Phi$, and the pressing forces Fa, Fb are also changed with the changes of the pinch angles $\alpha$, $\beta$. Further, it is necessary to study a magnitude and a direction of each of the pressing forces Fa, Fb which is based on a corresponding one of the pinch angles $\alpha$, $\beta$ of a corresponding one of all of the six balls A1, A3, A5, B2, B4, B6. FIG. 9 is a view showing characteristics of the changes of the pinch angles $\alpha$, $\beta$ of the six balls A1, A3, A5, B2, B4, B6, which are caused depending on the joint angle $\Phi$, when the inner joint member 14 is pivoted relative to the outer joint member 12 upwardly and downwardly within a plane containing the centers of the respective balls A1, B4. When the shaft 16 of the inner joint member 14 is pivoted upwardly (toward the ball A1), the joint angle $\Phi$ takes a positive value, for example, $\Phi$=46 degrees in a case shown in right-side view of FIG. 8. When the shaft 16 of the inner joint member 14 is pivoted downwardly (toward the ball B4), the joint angle $\Phi$ takes a negative value, for example, $\Phi$=−46 degrees in a case shown in left-side view of FIG. 8. When the shaft 16 of the inner joint member 14 is pivoted upwardly (joint angle $\Phi$>0) as indicated by arrow Up in FIG. 7, a value of the pinch angle $\beta$ of the ball B6 located on an upper side of the centerline S1 is negative in an entire range of $\Phi$>0, and a value of the pinch angle $\alpha$ of the ball A3 located on a lower side of the centerline S1 is positive in the entire range of $\Phi$>0, as shown in FIG. 9, so that the cage 26 is smoothly pivoted in counterclockwise direction with the balls B6, A3 being moved by the pressing forces Fb, Fa applied to the balls B6, A3.

Figure 15:
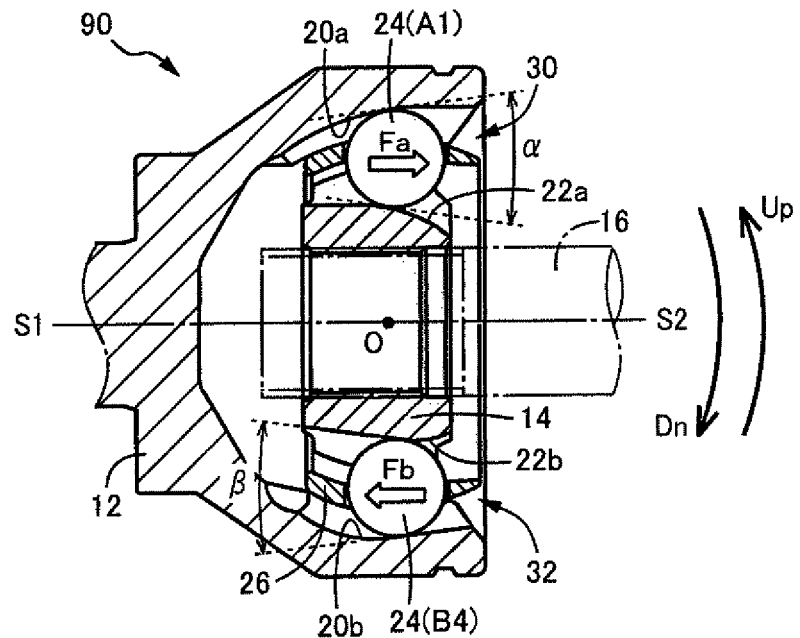
FIG. 15 is a cross sectional view corresponding to FIG. 7 that shows the constant-velocity universal joint (as the embodiment of the invention) of FIG. 1, and explaining the conventional constant-velocity universal joint in which the absolute values of the pinch angles $\alpha$, $\beta$ are equal to with each other.
Figure 16:
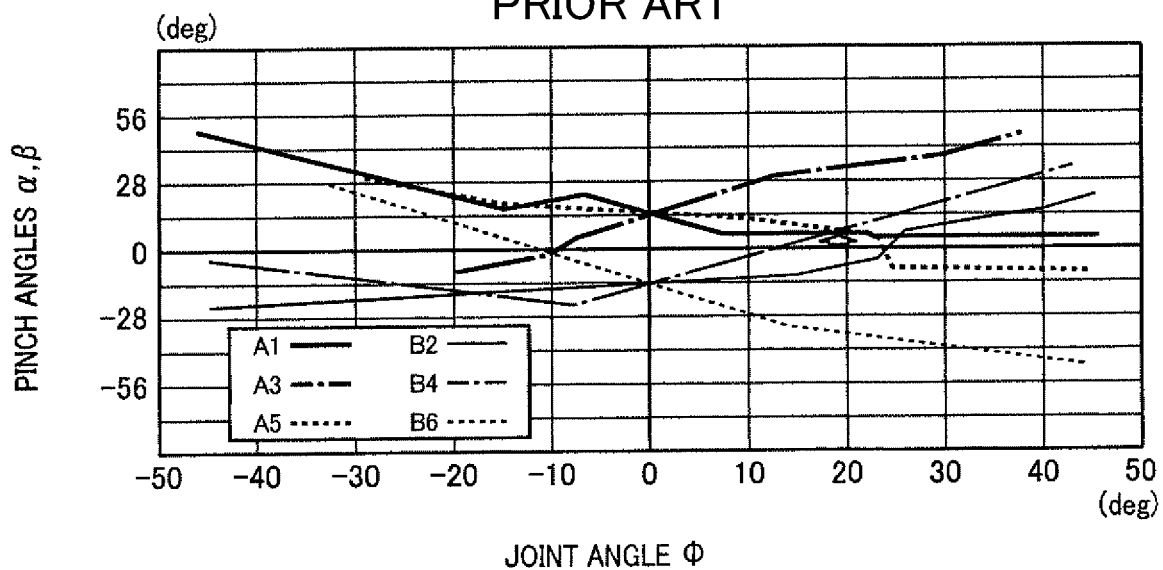
FIG. 16 is a view corresponding to FIG. 9 that relates to the constant-velocity universal joint (as the embodiment of the invention) of FIG. 1, and showing characteristics of changes of the pinch angles $\alpha$, $\beta$ of the six balls A1, A3, A5, B2, B4, B6 (that are defined as in FIG. 8), in relation with the joint angle $\Phi$ in the conventional constant-velocity universal joint of FIG. 15.

By the way, FIG. 15 shows, by way of example, a conventional constant-velocity universal joint 90 in which the absolute value $\alpha$abs of the pinch angle $\alpha$ of the first groove portion 30 and the absolute value $\beta$abs of the pinch angle $\beta$ of the second groove portion 32 are equal to each other in the reference state (i.e., state shown in FIG. 15) with the joint angle $\Phi$ being 0 degrees, such that the pinch angle $\alpha$ is 14 degrees and the pinch angle $\beta$ is −14 degrees in the reference state. FIG. 16 is a view corresponding to the view of FIG. 9, and showing changes of the pinch angles $\alpha$, $\beta$ depending on the joint angle $\Phi$ when the shaft 16 of the inner joint member 14 is pivoted relative to the outer joint member 12 upwardly and downwardly within the plane containing the centers of the respective balls A1, B4 in the conventional constant-velocity universal joint 90 of FIG. 15. When the shaft 16 of the inner joint member 14 is pivoted upwardly (toward the first groove portion 30), the joint angle $\Phi$ takes a positive value, for example, $\Phi$=46 degrees in a case shown in right-side view of FIG. 8. When the shaft 16 of the inner joint member 14 is pivoted downwardly (toward the second groove portion 32), the joint angle $\Phi$ takes a negative value, for example, $\Phi$=46 degrees in a case shown in left-side view of FIG. 8. Further, regarding the sign of the pinch angles $\alpha$, $\beta$, the pinch angle takes a positive value when it opens toward the opening end of the outer joint member 12 (in the rightward direction as seen in FIG. 15), and takes a negative value when it opens toward the bottom wall of the outer joint member 12 (in the leftward direction as seen in FIG. 15). In this arrangement, when the joint angle $\Phi$ is in the vicinity of 20 degrees, the pinch angle $\alpha$ of the ball A1, which is one of the three balls A1, B2, B6 located on an upper side of the centerline S1, is positive, while the pinch angles $\beta$ of the balls B2, B6, which are the others of the three balls A1, B2, B6 located on the upper side of the centerline S1, are negative. Further, the pinch angles $\alpha$, $\beta$ of the balls A3, A5, B4, which are located on a lower side of the centerline S1, are all positive. Therefore, when the constant-velocity universal joint 90 is to be placed back into the reference state after the shaft 16 of the inner joint member 14 has been pivoted upwardly, only the ball A1 receives the pressing force Fa acting in the returning direction, and the pinch angle $\alpha$ of the ball A1 is small (not larger than 10 degrees) in the vicinity of 20 degrees as the joint angle $\Phi$, namely, the pressing force Fa applied to the ball A1 is not large enough, so that there is a possibility of generation of noise or the like caused by, for example, resistance to pivot movement of the cage 26 and delay of the pivot movement of the cage 26. It is noted that a value or range of the joint angle $\Phi$, which is to be problematic, varies depending on characteristics of changes of the pinch angles $\alpha$, $\beta$ in relation with the joint angle $\Phi$, namely, depending on, for example, shapes of bottoms of the track grooves 20a, 20b, 22a, 22b. Such bending and return from the bending at a certain phase is executed, for example, at a test or the like made in a factory, and could be executed also in an actual drive of a vehicle, for example, when a direction of steerable wheels is changed during stop of the vehicle, where the constant-velocity universal joint is provided in a front wheel axle of the vehicle.

On the other hand, in the constant-velocity universal joint 10 according to the present embodiment in which the absolute value $\alpha$abs of the pinch angle $\alpha$ of the first groove portion 30 is larger than the absolute value $\beta$abs of the pinch angle $\beta$ of the second groove portion 32, as is apparent from FIG. 9, in the vicinity of the joint angle $\Phi$ of 20 degrees, (i) the pinch angle $\alpha$ of the ball A1 as one of the balls A1, B2, B6 located on an upper side of the centerline S1 takes a positive value, (ii) the pinch angles $\beta$ of the respective balls B2, B6 as the others of the balls A1, B2, B6 located on the upper side both take negative values, and (iii) the pinch angles $\alpha$, $\beta$ of the balls A3, A5, B4 located on a lower side of the centerline S1 all take positive values, as in the conventional constant-velocity universal joint 90 shown in FIGS. 15 and 16. That is, the constant-velocity universal joint 10 is the same as the conventional constant-velocity universal joint 90 in that only the ball A1 contributes to the pivot movement of the cage 26. However, in the constant-velocity universal joint 10, the pinch angle $\alpha$ of the ball A1 is about 20 degrees, and is much larger than that (not larger than 10 degrees as shown in FIG. 16) in the conventional constant-velocity universal joint 90. Therefore, in the constant-velocity universal joint 10, the ball A1 is pressed to be moved by the large pressing force Fa based on the large pinch angle $\alpha$, whereby the cage 26 can be smoothly pivoted in the clockwise direction about the joint center O.

Figure 10:
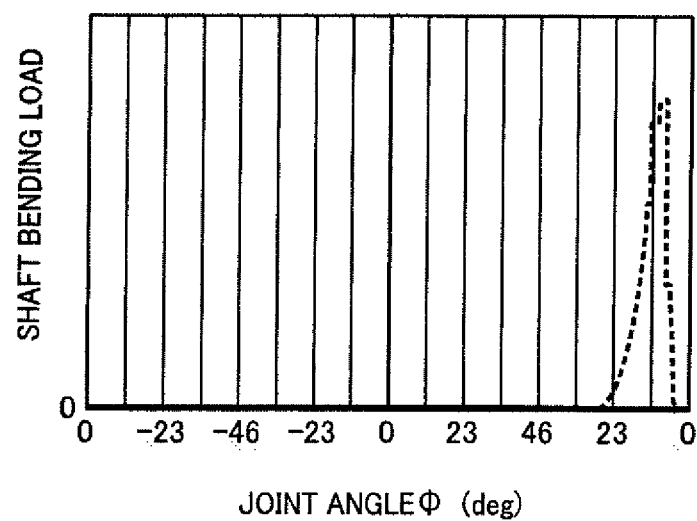
FIG. 10 is a view showing change (solid line) of a shaft bending load generated in the constant-velocity universal joint of FIG. 1 when it is returned from being bent, as shown in FIG. 8, as compared with that (broken line) in a conventional constant-velocity universal joint in which absolute values of the pinch angles $\alpha$, $\beta$ are equal to with each other.

FIG. 10 is a graph of change of a shaft bending load generated in the constant-velocity universal joint 10 when the joint angle $\Phi$ is changed within a range of ±46 degrees as shown in FIG. 8. In the present embodiment, the shaft bending load is substantially zero throughout the entire range of the joint angle Φ, as indicated by solid line in FIG. 10. On the other hand, in FIG. 10, broken line indicates change of a shaft bending load generated in the conventional constant-velocity universal joint 90 shown in FIGS. 15 and 16. In the conventional constant-velocity universal joint 90, where the joint is returned to the reference state from being bent by +46 degrees, the shaft bending load is abruptly increased when the joint angle Φ becomes not larger than 20 degrees. Thus, in the conventional constant-velocity universal joint 90, it is not possible to appropriately obtain an effect by the pinch angles α, β to pivot the cage 26, and it is considered that resistance to pivot movement of the cage 26 is large.

In the constant-velocity universal joint 10 according to the present embodiment, the absolute value αabs of the pinch angle α of the first groove portions 30 is larger than the absolute value βabs of the pinch angle β of the second groove portions 32 in the reference state, so that the pressing force Fa applied to the balls 24 by the pinch angle α in the first groove portions 30 is made large, as described above. Therefore, even in a range of the joint angle Φ in which a sufficiently large pressing force Fa cannot be obtained by the pinch angle α in the first groove portions 30 in a conventional constant-velocity universal joint, for example, in a range including about 20 degrees and larger than 20 degrees during return from being bent toward +46 degrees, the pressing force Fa applied to the ball 24 (A1) is made sufficiently large whereby the cage 26 can be smoothly pivoted by movement of the ball 24 (A1) by the pressing force Fa applied to the ball 24 (A1).

Further, the absolute value αabs of the pinch angle α in the first groove portions 30 is larger than the absolute value βabs of the pinch angle β in the second groove portions 32 by a range from 2 degrees to 10 degrees in the reference state. In the present embodiment, the absolute value αabs is larger than the absolute value βabs by 8 degrees in the reference state. Therefore, the pressing force Fa applied to the balls 24 in the first groove portions 30 is made reliably large whereby the cage 26 can be appropriately pivoted by movement of the balls 24 by the pressing force Fa applied to the balls 24.

Further, when the constant-velocity universal joint 10 is bent within the plane containing one of the first groove portions 30, the pinch angle α in the one of the first groove portions 30 is maintained irrespective of the joint angle Φ, such that the value of the pinch angle α in the one of the first groove portions 30 is positive, namely, the radial distance between a corresponding one of the outer track grooves 20a and a corresponding one of the inner track grooves 22a in the radial direction is generally increased in the direction toward the opening end of the outer joint member 12, and such that the absolute value αabs of the pinch angle α in the one of the first groove portions 30 is larger than the absolute value βabs (14 degrees) of the pinch angle β in the second groove portions 32 in the reference state. Thus, irrespective of the joint angle Φ, namely, throughout an entire range of the joint angle Φ, the pressing force Fa applied to the ball 24 by the pinch angle α in the above-described one of the first groove portions 30 is maintained relatively large. Therefore, the cage 26 can be smoothly pivoted by movement of the ball 24 by the pressing force Fa depending on a bending direction.

Further, each of the outer track grooves 20a, 20b of the first and second groove portions 30, 32 has the bottom that includes a straight portion defined by a straight line in the axial cross section, and the outer contact point lies in the straight portion (corresponding to the inclined straight portion 40 or inclined straight portion 50 of the ball locus La1 or ball locus Lb1) of the bottom of each of the outer track grooves 20a, 20b at least in the normal region Ea, namely, at least when the joint angle Φ is not larger than 7 degrees. Similarly, each of the inner track grooves 22a, 22b of the first and second groove portions 30, 32 has the bottom that includes a straight portion defined by a straight line in the axial cross section, and the inner contact point lies in the straight portion (corresponding to the inclined straight portion 40 or inclined straight portion 50 of the ball locus La2 or ball locus Lb2) of the bottom of each of the inner track grooves 22a, 22b at least in the normal region Ea. Therefore, a portion of each of the track grooves 20a, 20b, 22a, 22b, which corresponds to the normal region Ea, can be machined easily with a high accuracy so that it is possible to appropriately obtain the pressing forces Fa, Fb depending on the pinch angles α, β.

Meanwhile, due to the arrangement in which the pinch angles α, β of the respective first and second groove portions 30, 32 are different from each other, the cage 26 is displaced in a displacement direction that eliminates play when a load is applied to the outer and inner joint members 12, 14, namely, when the torque is transmitted between the outer and inner joint members 12, 14, wherein the displacement direction is dependent on the first groove portion 30 as the larger-pinch-angle groove portion in which the absolute value αabs of the pinch angle α is large. Thus, the radial clearance in each second groove portion 32 as the smaller-pinch-angle groove portion in which the absolute value βabs of the pinch angle β is small, is made small whereby a ball/groove surface pressure acting between the ball 24 and each of the second outer and inner track grooves 20b, 22b is increased. Such an increase of the ball/groove surface pressure leads to problematic reductions of durability and torque-transmission efficiency. In general, the radial clearance in each first groove portion 30 and the radial clearance in each second groove portion 32 are substantially equal to each other in an assembled state, i.e., in absence of the load without any torque being transmitted between the outer and inner joint members 12, 14. In this arrangement, when the pressing force Fa applied to the ball 24 disposed in each first groove portion 30 as the larger-pinch-angle groove portion is made larger than the pressing force Fb applied to the ball 24 disposed in each second groove portion 32 as the smaller-pinch-angle groove portion in presence of the load, the cage 26 is moved together with the ball 24 disposed in each first groove portion 30 in rightward direction as seen in FIG. 7, i.e., in the direction toward the opening end of the cup-shaped outer joint member 12, so as to eliminate the play. The cage 26 is attached to the outer joint member 12 such that the cage 26 has a certain degree of play in directions parallel to an axis of the cage 26 (corresponding to the centerlines S1, S2 in the reference state as shown in FIG. 7), for thereby permitting a posture of the cage 26 to be changed relative to the outer and inner joint members 12, 14, with change of the joint angle Φ. Where the first groove portion 30 and the second groove portion 32 are substantially the same as each other in terms of the absolute value of the pinch angle in the reference state, as in the conventional constant-velocity universal joint 90 shown in FIG. 15, the first groove portion 30 and the second groove portion 32 are substantially the same as each other also in terms of a magnitude of the pressing force applied to the ball 24, so that the cage 26 is held in its neutral position without the cage 26 being displaced to eliminate the play and accordingly the radial clearance in each groove portion is not substantially changed.

Figure 12:
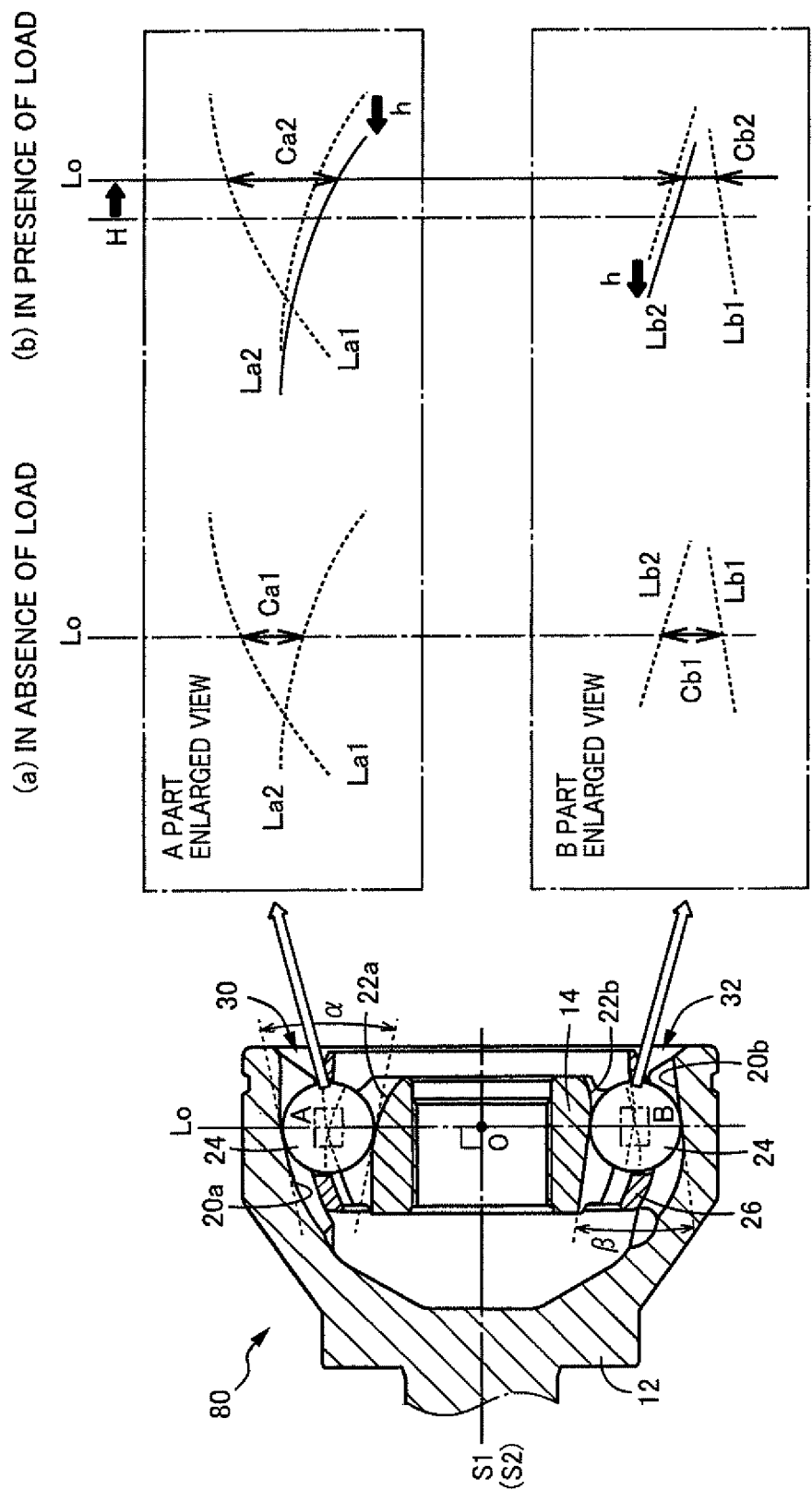
FIG. 12 is a set of view for explaining increase and reduction of the radial clearances in the first and second groove portions of a constant-velocity universal joint in which the absolute value of the pinch angle of the first groove portion is larger than the absolute value of the pinch angle of the second groove portion and in which the radial clearance in the first groove portion and the radial clearance in the second groove portion are equal to each other in absence of the load.

However, where the absolute value αabs of the pinch angle α of each first groove portion 30 and the absolute value βabs of the pinch angle β of the second groove portion 32 are different from each other as in the constant-velocity universal joint 10 according to the present embodiment, the radial clearance in the second groove portion 32 as the smaller-pinch-angle groove portion is reduced. FIG. 12 is a view for explaining change of the radial clearance in the first and second groove portions 30, 32 in a constant-velocity universal joint 80 as a comparative example in which the first groove portion 30 is the larger-pinch-angle groove portion while the second groove portion 32 is the smaller-pinch-angle groove portion, namely, in which the absolute value αabs of the pinch angle α of the first groove portion 30 is larger than the absolute value βabs of the pinch angle β of the second groove portion 32 in the reference state. In this constant-velocity universal joint 80, as indicated in "(a) IN ABSENCE OF LOAD" of FIG. 12, the radial clearance Ca1 in each first groove portion 30 and the radial clearance Cb1 in each second groove portion 32 are substantially equal to each other in absence of the load. The radial clearance Ca1 corresponds to a radial distance between the ball locus La1 defined by the first outer track groove 20a and the ball locus La2 defined by the first inner track groove 22a in each first groove portion 30, while the radial clearance Cb1 corresponds to a radial distance between the ball locus Lb1 defined by the second outer track groove 20b and the ball locus Lb2 defined by the second inner track groove 22b in each second groove portion 30.

In presence of the load with the torque being transmitted between the outer and inner joint members 12, 14 in the reference state, as indicated in "(b) IN PRESENCE OF LOAD" of FIG. 12, the pressing force Fa applied to the ball 24 in each first groove portion 30 as the larger-pinch-angle groove portion is larger in magnitude than the pressing force Fb applied to the ball 24 in each second groove portion 32 as the smaller-pinch-angle groove portion, so that the cage 26 is displaced together with the ball 24, by a distance H corresponding to the play, in the direction in which the pinch angle α is open, i.e., in rightward direction as seen in FIG. 12, so as to eliminate the play, whereby the radial clearance Ca2 in each first groove portion 30 is made larger than in the absence of the load while the radial clearance Cb2 in each second groove portion 32 is made smaller than in the absence of the load. FIG. 12 shows a case in which there is play of support members such as bearings in addition to the play of the cage 26 so that the inner joint member 14 is displaced relative to the outer joint member 12 by a distance h corresponding to the play of the support members whereby the radial clearances Ca2, Cb2 are further increased and reduced, respectively.

Figure 13:
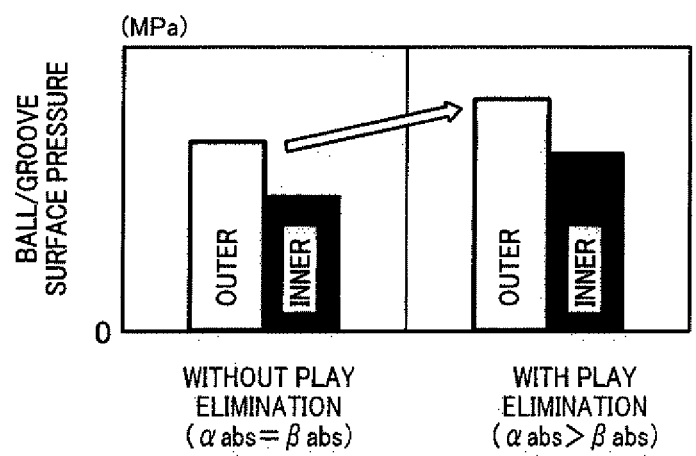
FIG. 13 is a view showing a ball/groove surface pressure acting on an outer side part of the second groove portion as a smaller-pinch-angle groove portion and a ball/groove surface pressure acting on an inner side part of the second groove portion, in an arrangement in which plays are not eliminated even in presence of the load, and in an arrangement in which the plays are eliminated in presence of the load, in a comparative manner.
Figure 14:
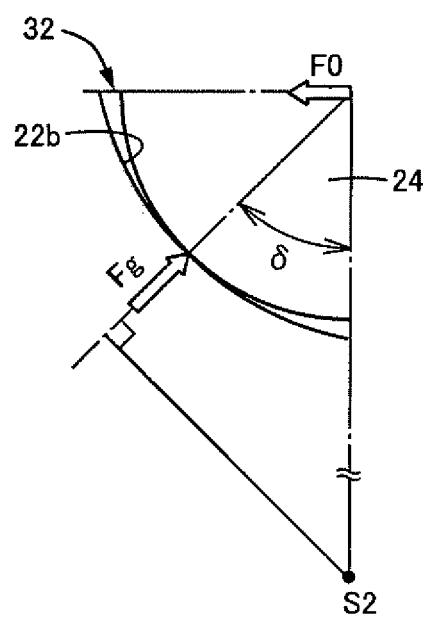
FIG. 14 is a view for explaining a ball-groove load Fg applied from the ball to the inner track groove in the second groove portion when torque (rotation) is transmitted through the constant-velocity universal joint.

FIG. 13 is a view showing the ball/groove surface pressure acting on an outer side part (i.e., the second outer track groove 20b) of the second groove portion 32 and the ball/groove surface pressure acting on an inner side part (i.e., the second inner track groove 22b) of the second groove portion 32, in an arrangement in which the absolute value αabs of the pinch angle α and the absolute value βabs of the pinch angle β are equal to each other (αabs=βabs) so that the plays are not eliminated even in presence of the load, and in another arrangement in which the absolute value αabs of the pinch angle α is larger than the absolute value βabs of the pinch angle β (αabs>βabs) so that the plays are eliminated in presence of the load, in a comparative manner. As shown in FIG. 13, when the radial clearance Cb2 is reduced by elimination of the plays, the ball/groove surface pressure is increased on both of the outer and inner side parts of the second groove portion 32. The ball/groove surface pressure corresponds to a ball-groove load Fg shown in FIG. 14, which is view for explaining the ball-groove load Fg applied between the ball 24 and the second inner track groove 22b in the second groove portion 32 in presence of the load with the torque being transmitted from the outer joint member 12 to the inner joint member 14. The ball-groove load Fg is expressed by equation (1) using a contact angle δ and a load F0 of the ball 24. The contact angle δ is reduced with reduction of the radial clearance Cb2 in the second groove portion 32, and the reduction of the contact angle δ causes increase of the ball-groove load Fg, i.e., increase of the ball/groove surface pressure.

$$Fg=F0/\sin δ \quad (1)$$

Figure 11:
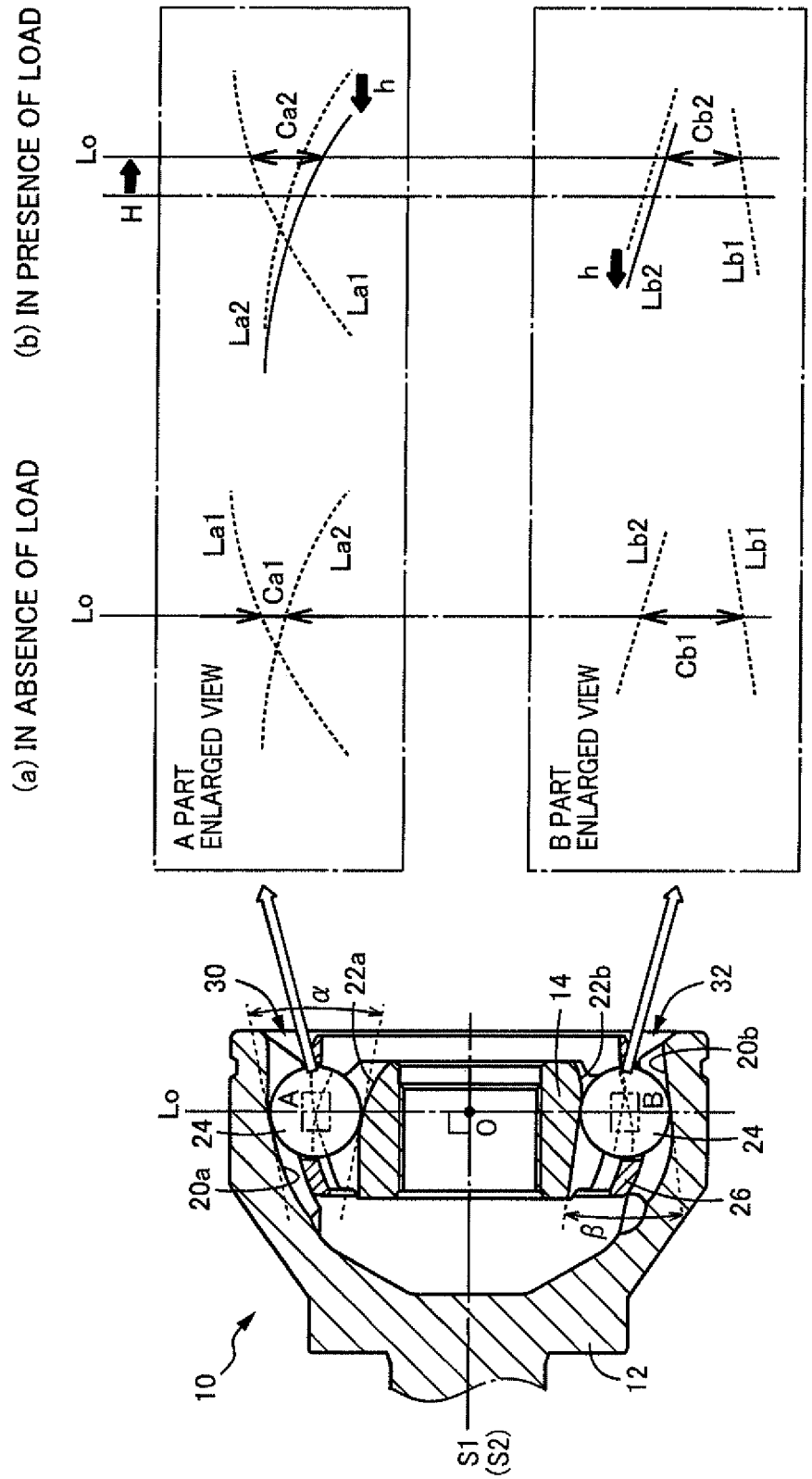
FIG. 11 is a set of views for explaining radial clearances in the first and second groove portions of the constant-velocity universal joint of FIG. 1, in absence of a load and in presence of the load, in a comparative manner.

On the other hand, in the constant-velocity universal joint 10 according to the present embodiment, as indicated in "(a) IN ABSENCE OF LOAD" of FIG. 11, the radial clearance Ca1 in each first groove portion 30 and the radial clearance Cb1 in each second groove portion 32 are different from each other in absence of the load in the reference state, such that the radial clearance Cb1 in each second groove portion 32 as the smaller-pinch-angle groove portion is larger than the radial clearance Ca1 in each first groove portion 30 as the larger-pinch-angle groove portion. Owing to this arrangement, in presence of the load with the torque being transmitted between the outer and inner joint members 12, 14 in the reference state, as indicated in "(b) IN PRESENCE OF LOAD" of FIG. 11, the cage 26 is displaced together with the ball 24, based on the pressing force Fa applied to the ball 24 in each first groove portion 30, by a distance H corresponding to the play, in the direction in which the pinch angle α is open, i.e., in rightward direction as seen in FIG. 11, so as to eliminate the play, whereby the radial clearance Ca2 in each first groove portion 30 is made larger than the radial clearance Ca1 in the absence of the load while the radial clearance Cb2 in each second groove portion 32 is made smaller than the radial clearance Cb1 in the absence of the load, so that a difference between the radial clearances Ca2, Cb2 is made small. Further, the inner joint member 14 is displaced relative to the outer joint member 12, by a distance h corresponding to the play of support members such as bearings, in leftward direction as seen in FIG. 11, i.e., in a direction toward the bottom wall of the outer joint member 12, so as to eliminate the play of the support members, so that the difference between the radial clearances Ca2, Cb2 is made further small whereby the radial clearances Ca2, Cb2 are made substantially equal to each other (Ca2 Cb2) in the present embodiment. In other words, the radial clearance Cb1 in each second groove portion 32 is set to be larger than the radial clearance Ca1 in each first groove portion 30 in the assembled state, i.e., in absence of the load without any torque being transmitted between the outer and inner joint members 12, 14, such that the radial clearances Ca2, Cb2 are made substantially equal to each other in presence of the load with the torque being transmitted between the outer and inner joint members 12, 14. It is noted that the radial clearance in each first groove portion 30 is interpreted to mean a radial clearance between the first groove portion 30 and the ball 24 disposed in the first groove portion 30, more precisely, a radial clearance corresponding to a sum of a radially outer clearance from the first outer track groove 20a to the ball 24 disposed in the first groove portion 30 and a radially inner clearance from the first inner track groove 22a to the ball 24 disposed in the first groove portion 30, wherein the first outer and inner track grooves 20a, 22a cooperate to define the first groove portion 30. It is further noted that the radial clearance in each second groove portion 32 is interpreted to mean a radial clearance between the second groove portion 32 and the ball 24 disposed in the second groove portion 32, more precisely, a radial clearance corresponding to a sum of a radially outer clearance from the second outer track groove 20b to the ball 24 disposed in the second groove portion 32 and a radially inner clearance from the second inner track groove 22b to the ball 24 disposed in the second groove portion 32, wherein the second outer and inner track grooves 20b, 22b cooperate to define the second groove portion 32.

As described above, in the constant-velocity universal joint 10, the absolute value αabs of the pinch angle α of each first groove portion 30 and the absolute value βabs of the pinch angle β of each second groove portion 32 are different from each other in the reference state, so that the cage 26 is displaced based on the pressing force Fa applied to the ball 24 disposed in each first groove portion 30 as the larger-pinch-angle groove portion, in the displacement direction that eliminates the play of the cage 26 by the distance H corresponding to the play of the cage 26, when load is applied to the outer and inner joint members 12, 14, namely, when the torque is transmitted between the outer and inner joint members 12, 14. With displacement of the cage 26 in the displacement direction, the radial clearance Ca2 in each first groove portion 30 as the larger-pinch-angle groove portion is made larger than in absence of the load, while the radial clearance Cb2 in each second groove portion 32 as the smaller-pinch-angle groove portion is made smaller than in absence of the load. However, when the load is not applied to the outer and inner joint members 12, 14, namely, when the torque is not transmitted between the outer and inner joint members 12, 14, the radial clearance Cb1 in each second groove portion 32 as the smaller-pinch-angle groove portion is larger than the radial clearance Ca1 in each first groove portion 30 as the larger-pinch-angle groove portion. Therefore, when the torque is transmitted between the outer and inner joint members 12, 14, both of the radial clearance Ca2 in each first groove portion 30 and the radial clearance Cb2 in each second groove portion 32 can be kept within desired ranges, in spite of increase and reduction of the radial clearances in the first and second groove portions 30, 32. In the present embodiment, in presence of the load, the displacement of the cage 26 for eliminating the play of the cage 26 and the displacement of the inner joint member 14 relative to the outer joint member 12 for eliminating the play of the support members such as bearings are made whereby the radial clearances Ca2, Cb2 are made substantially equal to each other so as to be kept within appropriate ranges in presence of the load. Consequently, as compared with the constant-velocity universal joint 80 shown in FIG. 12 in which the radial clearances Ca1, Cb1 are substantially equal to each other in absence of the load, and the radial clearance Cb2 in each second groove portion 32 as the smaller-pinch-angle groove portion is made small in presence of the load, it is possible to more reliably restrain increase of the ball/groove surface pressure acting between the ball 24 and each of the second outer and inner track grooves 20b, 22b and accordingly to improve the durability and torque-transmission efficiency.

In the above-described embodiment, the absolute value αabs of the pinch angle α of each first groove portion 30 is made larger than the absolute value βabs of the pinch angle β of each second groove portion 32 in the reference state, namely, each first groove portion 30 corresponds to the larger-pinch-angle groove portion while each second groove portion 32 corresponds to the smaller-pinch-angle groove portion, for the purpose of restraining increase of the shaft bending load which could be caused if the cage 26 is impeded from being smoothly pivoted in the vicinity of 20 degrees as the joint angle Φ when the shaft 16 of the inner joint member 14 is to be returned to the reference state after the shaft 16 has been pivoted upwardly (see FIG. 7). However, the present invention is applicable as long as the absolute value αabs of the pinch angle α of each first groove portion 30 and the absolute value βabs of the pinch angle β of each second groove portion 32 are different from each other in the reference state. For example, each second groove portion 32 may correspond to the larger-pinch-angle groove portion while each first groove portion 30 may correspond to the smaller-pinch-angle groove portion, so that the absolute value βabs of the pinch angle β of each second groove portion 32 is larger than the absolute value αabs of the pinch angle α of each first groove portion 30 in the reference state. In this modified arrangement, the radial clearance Ca1 in each first groove portion 30 in absence of the load is made larger than the radial clearance Cb1 in each second groove portion 32 in absence of the load.

Further, although the above-described pinch angles α, β may be respective angle values in absence of the load, there is a possibility that the pinch angles α, β could be changed by eliminations of the play of the cage 26 and the play of the support members in presence of the load. The pinch angles α, β are provided for the purpose of obtaining desired magnitudes of the pressing forces Fa, Fb, which are to be generated in presence of the load with the torque being transmitted between the outer and inner joint members 12, 14. Therefore, it is preferable to form the shapes of the outer and inner track grooves such that, precisely, the pinch angles α, β have respective required angle values in presence of the load in the reference state.

While the preferred embodiment of this invention has been described in detail by reference to the drawings, it is to be understood that the embodiment described above is given for illustrative purpose only, and that the present invention may be embodied with various modifications and improvements which may occur to those skilled in the art.

NOMENCLATURE OF ELEMENTS

10: constant-velocity universal joint
12: outer joint member
14: inner joint member
20a: outer track groove
20b: outer track groove
22a: inner track groove
22b: inner track groove
24: ball
A1, A3, A5, B2, B4, B6: balls
26: cage
28: pocket
30: first groove portion
32: second groove portion
S1: centerline of the outer joint member
S2: centerline of the inner joint member
Φ: joint angle
α: pinch angle of the first groove portion
β: pinch angle of the second groove portion
H: play of cage
Ca1: radial clearance in first groove portion in absence of load
Cb1: radial clearance in second groove portion in absence of load

What is claimed is:

1. A constant-velocity universal joint comprising:
a generally cup-shaped outer joint member having a plurality of outer track grooves provided in an inner circumferential surface thereof;
an inner joint member having a plurality of inner track grooves provided in an outer circumferential surface thereof, said inner joint member being disposed inside said outer joint member;
a plurality of balls interposed between said outer track grooves and said inner track grooves, so as to transmit a torque between said outer joint member and said inner joint member; and
a generally annular-shaped cage disposed between said outer joint member and said inner joint member, and having a plurality of pockets holding therein said balls, wherein:
said outer track grooves and said inner track grooves cooperate to define a plurality groove portions, such that each of said balls is disposed in a corresponding one of said groove portions,
each of said balls, which is disposed in a corresponding one of said groove portions, is pinched between one of said outer track grooves and one of said inner track grooves that cooperate with each other to define said corresponding one of said groove portions, and is substantially in contact at outer and inner contact points with said one of said outer track grooves and said one of said inner track grooves, respectively,
an outer tangent plane that is tangent to each of said balls at said outer contact point and an inner tangent plane that is tangent to each of said balls at said inner contact point cooperate with each other to define a pinch angle at an intersection of said outer tangent plane and said inner tangent plane,
said groove portions include a first groove portion in which a radial distance between a corresponding one of said outer track grooves and a corresponding one of said inner track grooves in a radial direction of said outer joint member is generally increased in a direction toward an opening end of said outer joint member in a reference state in which centerlines of said outer joint member and said inner joint member lie in a straight line with a joint angle defined by said centerlines being zero degrees,
said groove portions include a second groove portion in which a radial distance between a corresponding one of said outer track grooves and a corresponding one of said inner track grooves in said radial direction is generally reduced in said direction toward said opening end of said outer joint member in said reference state,
said first groove portion and said second groove portion are alternately arranged about said centerlines,
one of said first groove portion and said second groove portion is a larger-pinch-angle groove portion while the other of said first groove portion and said second groove portion is a smaller-pinch-angle groove portion, such that an absolute value of said pinch angle of said larger-pinch-angle groove portion is larger than an absolute value of said pinch angle of said smaller-pinch-angle groove portion in said reference state,
said cage contacts one of said outer joint member and said inner joint member such that said cage has play in directions parallel to an axis of said cage,
when the torque is not transmitted between said outer joint member and said inner joint member through said balls in said reference state, a first radial clearance between said smaller-pinch-angle groove portion and a corresponding one of said balls disposed in said smaller-pinch-angle groove portion is larger than a second radial clearance between said larger-pinch-angle groove portion and a corresponding one of said balls disposed in said larger-pinch-angle groove portion, and
the first radial clearance and the second radial clearance are substantially equal when there is a load.

2. The constant-velocity universal joint according to claim 1,
wherein said first groove portion and said second groove portion are located in respective positions that are symmetrical with respect to said centerlines.

3. The constant-velocity universal joint according to claim 1,
wherein said first groove portion is said larger-pinch-angle groove portion while said second groove portion is said smaller-pinch-angle groove portion, so that said radial clearance between said second groove portion and a corresponding one of said balls disposed in said second groove portion is larger than said radial clearance between said first groove portion and a corresponding one of said balls disposed in said first groove portion when the torque is not transmitted between said outer joint member and said inner joint member through said balls in said reference state.

* * * * *